US006766099B1

(12) United States Patent
Robertson et al.

(10) Patent No.: US 6,766,099 B1
(45) Date of Patent: Jul. 20, 2004

(54) STORAGE AND TRANSMISSION OF HDTV SIGNALS

(76) Inventors: Charles Robertson, 58212 Coughran Ct., Sioux Falls, SD (US) 57106; Rod Schulz, 3008 S. Amanda Ct., Sioux Falls, SD (US) 57103

( * ) Notice: Subject to any disclaimer, the term of this patent is extended or adjusted under 35 U.S.C. 154(b) by 0 days.

(21) Appl. No.: 09/538,833

(22) Filed: Mar. 30, 2000

Related U.S. Application Data

(60) Provisional application No. 60/152,738, filed on Sep. 8, 1999.

(51) Int. Cl.[7] .............................. H04N 5/91; H04N 7/00; H04N 5/85
(52) U.S. Cl. ........................ 386/46; 386/123; 386/125
(58) Field of Search ......................... 386/46, 123, 124, 386/125, 126, 1, 37, 40, 45; 348/714, 719; 360/32; H04N 5/91, 7/00, 5/85

(56) References Cited

U.S. PATENT DOCUMENTS

| 5,500,939 | A | * | 3/1996 | Kurihara |
| 6,567,130 | B1 | * | 5/2003 | Schulz |
| 6,591,391 | B1 | * | 7/2003 | Rowenhorst et al. |
| 6,593,963 | B1 | * | 7/2003 | Safai |

* cited by examiner

Primary Examiner—Robert Chevalier

(57) ABSTRACT

Apparatus and methods are disclosed to store and transmit HDTV signals. The apparatus includes hard disk drives and DVD drives utilized to store HDTV signals and hardware and software to provide constant data feed of HDTV signals into a closed circuit where those signals may be utilized for demonstration purposes of televisions available in a retail store or may be utilized to service HDTV monitors.

6 Claims, 4 Drawing Sheets

STORAGE AND TRANSMISSION OF HDTV SIGNALS

This invention relates to apparatus and methods for receiving and storing and sending HDTV (high definition television) signals and, more particularly, to an apparatus and method for storing and transmitting those signals to display televisions in retail store outlets and to HDTV monitors for servicing same. This application is a continuation-in-part of a provisional application, Ser. No. 60/152,738 filed Sep. 8, 1999

BACKGROUND OF THE INVENTION

The change from analog electronic circuitry to digital electronic circuitry in the consumer electronics industry has brought about wide spread change in the products utilized by consumers. Examples of this change can be seen in personal computer and digital telephone circuitry. In the personal computer field, data storage apparatus in the form of hard disk drives and DVD (digital versatile disks) drives have allowed consumers to store massive amounts of digital data and have the ability to send that data to various display apparatus. The use of digital electronic technology has also enabled the advent of high definition television (HDTV) which will provide televisions with better picture quality, better viewing aspect ratio, and larger viewing screens.

With the advent of new ATSC digital television standards, manufacturers have begun producing high definition televisions. At this time, a large segment of the broadcast industry has not implemented these new standards. This leaves the manufacturers of HDTV televisions with no economical means of demonstrating their products for sale.

Since no off-the-air or cable signals are available in a large part of the world, the manufacturers of HDTV(s) need a device that is capable of supplying an HDTV compatible output. This need can be filled with a player that includes large capacity disk storage devices and advanced video compression algorithms in a device which acts similarly to a known player such as video cassette recorder.

As in the video cassette recorder or player, there must be some media for storing the video programming. With HDTV, all of the video and audio information is digital. This new HDTV player utilizes either a hard disk drive or a DVD drive as the media for storing the audio and video content of the HDTV programming. In order to use the hard disk drive or DVD drive for the storage media, a method for retrieving the video data and converting it to 8-VSB (vestigial side band) signal must be developed, as 8-VSB is the modulation format used to transmit HDTV signals.

A need has arisen to provide an inexpensive means of demonstrating HDTVs at least until television broadcast stations are running HDTV broadcast signals.

Additionally, a need has developed to provide means for storing 8-VSB signals to allow those signals to be used to service HDTV monitors.

It is an objective of the present invention, generally stated, to provide a player for storing and sending HDTV format signals in a closed circuit to HDTVS.

More particularly, it is a further objective of the present invention to provide an HDTV player utilizing a hard disc drive, or a DVD drive, for storing and retrieving video data and converting it to 8-VSB format for use in a closed circuit to demonstrate and/or service HDTVs

SUMMARY OF THE INVENTION

The invention resides in a high definition TV player capable of utilizing at least one of a hard disk drive and a DVD drive as the media for storing the audio and video content of HDTV programming. In order to utilize the hard disk drive or the DVD drive for the storage media, video data must be storable therein, and retrieved by the player which converts it to the 8-VSB modulation format used to provide signals to HDTVs.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings wherein like reference numerals identify like elements throughout, and in which:

DETAILED DESCRIPTION OF THE PREFERRED EMBODIMENT

Figure 1:
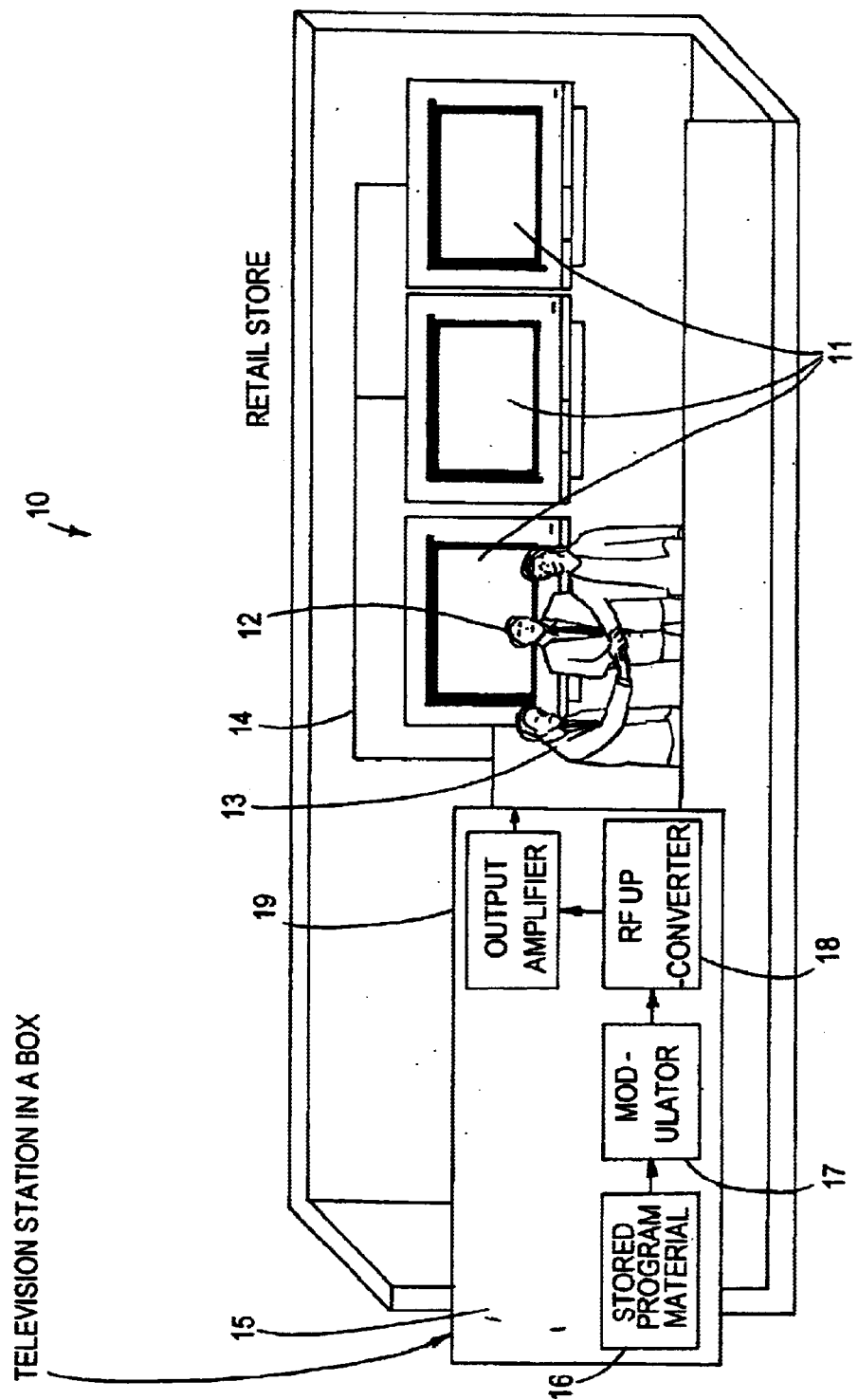
FIG. 1 is a diagrammatic view of the data storage and transmission unit of the present invention shown sending an HDTV compatible signal through a closed circuit to televisions on display in a retail store.

Referring to FIG. 1, a diagrammatic view of a retail appliance store is shown generally at 10, and it includes a plurality of television sets 11-11 which may be viewed by customers 12 and demonstrated by a salesman 13. In this embodiment, each of the televisions 11 is sent a signal in a closed circuit 14 from the present invention, generally indicated at 15, shown in block diagram, and identified as a television station in a box. The present invention 15 includes apparatus for storing program material 16. Apparatus 16 may be a hard disk drive a DVD disk drive or the like. Data containing the audio and digital signal is placed in this medium. This is the stored program material. This data is retrieved from the storage medium 16 and modulated to a base band signal by the modulator 17. The radio frequency up-converter 18 converts this base-band signal to an RF (radio frequency) signal. Finally, the RF signal is amplified and sent to the output by the output amplifier 19. This RF signal is then connected to an HDTV 11-11 where it is demodulated, decoded, and displayed.

Figure 2:
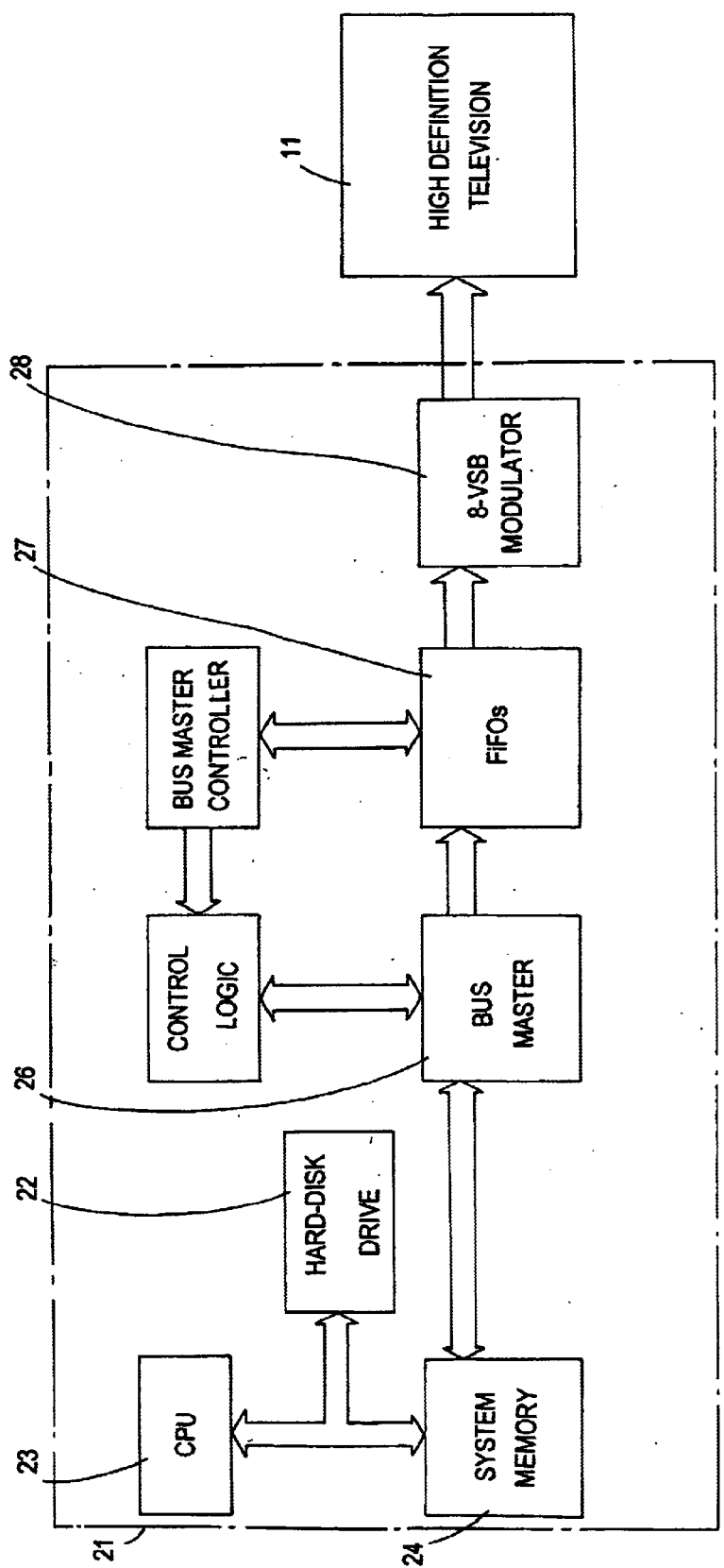
FIG. 2 is a block diagram of a first embodiment of the present invention.

Referring to FIG. 2, a more detailed block diagram of the data storage and transmitting operation of the first embodiment is generally indicated at 21. In this embodiment, this device may be called an HDTV player 21. The audio and video information is stored on the hard drive 22, which may be either a hard-disk drive as utilized in present personal computers, or a digital versatile disk drive which may also be used in computers or to show movies on a present generation television. This information is retrieved from the hard drive 22 by the CPU 23 (central processing unit) and stored in two 2-megabyte blocks on the system memory 24. The bus master controller 25 controls the flow of data from the system memory 24, through the bus master 26 to the FIFOs (first-in, first-out registers) 27. The bus master 26, under control of the bus master controller 25, copies 1K byte blocks from one of the 2-megabyte blocks in the system memory 24 into the FIFOs 27. After the block of data is copied to the FIFOs 27, the bus master 26 reads data from the other 2-megabyte block in the system memory 24. While the bus master 26 reads from the second block of system memory 24, the CPU 23 reads more data from the hard disk drive 22 and fills the first block of data in system memory 24.

After reading from one block of data in system memory 24 while the other is being filled, a constant flow of data is maintained into the FIFOs 27. This provides the 8-VSB modulator 28 of a constant flow of data from the FIFOs 27. The 8-VSB modulator 28 encodes the data, then converts the incoming data into one of eight voltage levels. This is the base band signal that is used to modulate the radio frequency carrier. This signal can be connected directly to a high definition television 11. The HDTV demodulates and converts the 8-VSB signal into audio and video.

Figure 3:
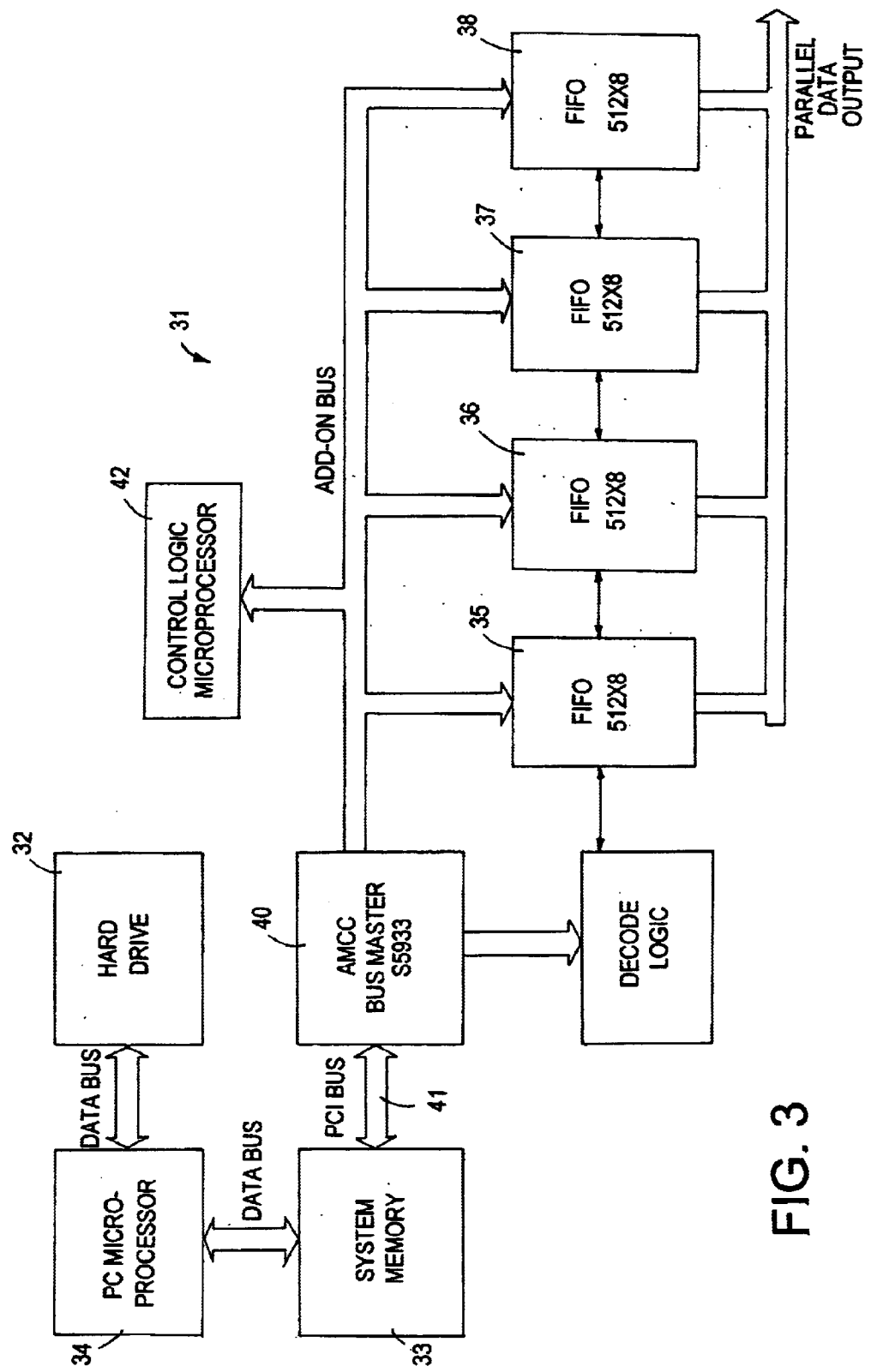
FIG. 3 is a block diagram of a second embodiment of the present invention.

Referring to FIG. 3, a second embodiment of the television station in a box is generally indicated at 31. Compressed video and audio information in this embodiment is stored on a hard drive 32, which similarly to the hard drive 22 of the first embodiment may be a hard disk drive or a digital video disk. Compressed digital video and audio information is stored on the hard drive 32 in either the MPEG compressed format or in a pre-encoded format. The pre-encoded format includes proprietary pre-processing of the MPEG data to ease the requirements of the 8-VSB modulator (not shown) and provides a level of copy protection to the system.

One of the main requirements of the data transfer is to re-clock the output data at a fixed rate required by the parallel interface and the modulation standard. Data retrieved from the hard drive 32 is not presented at a fixed rate. The transfer of data from the hard drive 32 to the system memory 33 is controlled by the computer's microprocessor 34 and is continually interrupted as the microprocessor 34 services other tasks and subroutines. Therefore, a buffer that allows data to be written at one rate and read at another is needed. This is accomplished with FIFO memory, generally indicated at 35–38, which has two separate ports for the input (written) data and the output (read) data. There is a separate clock for each data port.

The entire reclocking process is handled in two steps. The first step occurs when the microprocessor 34 moves the data into two concurrent 2Meg blocks of system memory 33. It initially fills both sections and then waits until one block is emptied by the reading process. As the read pointer transitions into the second block of system memory 33, the microprocessor 34 is notified to refill the first block. The refill cycle of the first block can be completed faster than the second block is emptied. This cycle of refilling the empty blocks continues until the system is stopped by the control circuitry. The next step is performed by four 512 byte blocks of FIFO memory 35–38. The second stage adds another level of buffering to the system memory 33 and provides another important step. Data in the hard drive 32 and system memory 33 are stored and manipulated in 32 bit wide words. The output of this system must be 8 bits wide. The 32 bit words from the system memory 33 are distributed across the four 8 bit FIFO's 35–38 by a bus master device 40 via the PCI bus 41. In the same manner as the system memory 33, the bus master 40 and separate control logic microprocessor 42 break each FIFO 35–38 into two sections. The sections are refilled as the read pointer transitions across the half full boundary of each device. The output is then taken sequentially from each of the 8 bit FIFOs 35–38 at the required rate and width.

The control logic maintains a constant flow of data to the output at one of two rates:

19.392658 megabits per second or 2.424082 megabytes per second.

21.524475 megabits per second or 2.690559 megabytes per second.

The 19.392658 megabits per second rate is the bit rate for the MPEG transport stream. This is the output data when the raw MPEG data is stored on the hard drive 32. The 21.524475 megabits per second rate is the bit rate required when the MPEG data is preencoded. This rate takes into account the data overhead required to store the Reed-Solomon error correction data and the additional field syncs.

Figure 4:
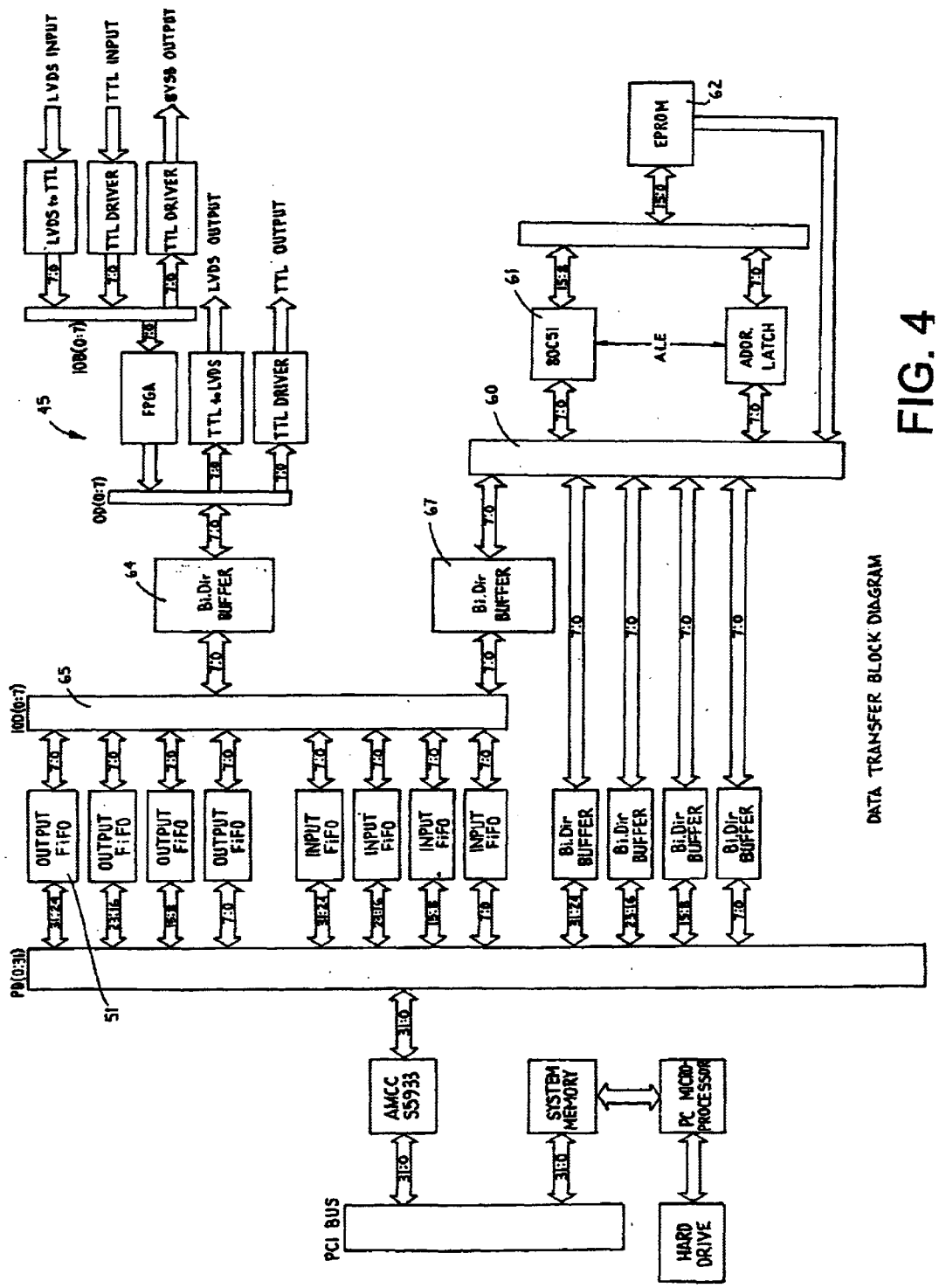
FIG. 4 is a data transfer block diagram for the second embodiment of the invention.

Referring to FIG. 4, a data transfer block diagram of the new apparatus shows a more detailed view of the transfer method used to produce a fixed output data rate necessary to generate an HDTV signal for demonstration purposes. FIG. 4 shows a little more detail of how the 32-bit add on bus is split into four 8-bit bytes. Each byte is routed to an input FIFO 46–49, an output FIFO 51/54 and a bidirectional buffer 55–58 for the add on microprocessor's data bus 60. The local (add-on) microprocessor 61 handles the control commands between the local hardware and the system PC via mailboxes in the AMCC S5933 bus master device. The local control software resides in the EPROM 62 which has a dedicated address bus and shares its data bus with the rest of the local devices.

The 8-bit local bus 65 is a bidirectional bus that all of the incoming and outgoing data share. This necessitates additional bidirectional buffers 63, 64 in the data path to eliminate the possibility of bus contention that can be caused by more than one device trying to actively drive the data bus.

Two different input and output standards are supported by this system, including TTL and LVDS. Input and output buffers are also included to convert the data to the appropriate levels for their parallel data ports. One additional buffer is used to transfer the data to another system board that develops the 8VSB modulated signal.

This transfer method provides a cost effective means of retrieving video data that has been stored on a consumer type hard drive and produces a fixed rate data interface for the MPEG transport system.

Applicant's present invention, as shown in both embodiments, provides a new and improved means for displaying working HDTVs 11 and also servicing high definition television monitors when there is, as yet, no television broadcast stations in the nation that are running with HDTV broadcast signals. The present invention provides an inexpensive means of demonstrating high definition TVs. It may be loaded with HDTV program material or user created program material for the purpose of showing the capabilities of the HDTV technology. It is essentially a television broadcast station in a box 15. It will provide all that a television station would provide if it were available. In fact, it is a much more flexible means of demonstrating HDTV. It can be controlled by a salesperson 13 allowing him to change the program material for the customer 12. This is something one could not do with a broadcast HDTV signal.

While two embodiments of the present invention have been shown and described, it will be understood that changes and additions to the embodiments may be made within the scope of the present invention. It is the aim of the present invention to cover all such changes and modifications within the scope of the appended claims.

What is claimed:

1. A data storage and transmitting apparatus for an HDTV player comprising:

means for storing digital HDTV signals, a central process unit in communication with said means for storing digital HDTV signals, system memory in communication with said central processing unit including at least first and second distinct blocks of memory, first in, first out registers, a bus master, and bus master controller means for controlling the flow of digital HDTV signals from the means for storing digital HDTV signals through said bus master to said first in, first out registers.

2. The apparatus as defined in claim 1 wherein said means for storing digital HDTV signals includes a hard disk drive.

3. The apparatus as defined in claim 1 wherein said means for storing digital HDTV signals includes a digital video disk drive.

4. A method of storing and transmitting of digital HDTV signals comprising the steps of:

copying a first block of digital HDTV signals from 1 of 2 distinct blocks in a computer system memory to first in, first out registers, copying a second block of digital HDTV signals from the other of said two distinct blocks in a computer system memory to the first in, first out registers, reading additional HDTV signals from a hard disk drive to fill said one of two distinct blocks in said computer system memory to maintain a constant flow of digital HDTV signals in the first in, first out registers, providing said constant flow of digital HDTV signals from said first in, first out registers to an 8-VSB modulator, encoding said digital HDTV signals, converting said digital HDTV signals into one of 8 voltage levels for providing a base band signal that is used to modulate a radio frequency carrier.

5. A method of re-clocking digital HDTV signals comprising:

filling two concurrent blocks of computer system memory with 32 bit wide digital HDTV signals, emptying one of said two concurrent blocks by a reading process, emptying a second of said two concurrent blocks by a reading process while a microprocessor orders the refill of said first block at a faster rate than the emptying of said second block, distributing said 32 bit wide digital HDTV signal across four 8 bit first in, first out registers by a bus master device via a bus, dividing each first in, first out registers into two sections, refilling each section as each register transitions a half full boundary, and providing a constant predetermined rate and width digital HDTV signal sequentially from each of the four 8-bit first in, first out registers.

6. The method as defined in claim 5 further including the steps of:

encoding the digital HDTV signal from each of the four 8-bit first in, first out registers, converting the digital HDTV signal into one of 8 voltage levels, and providing a base band signal used to modulate a radio frequency carrier.

* * * * *